Aug. 11, 1959  E. M. KUEHL  2,898,699
ARTIFICIAL FISHING LURE
Filed Oct. 10, 1957

INVENTOR.
ERNEST M. KUEHL
BY
ATTORNEY

United States Patent Office 2,898,699
Patented Aug. 11, 1959

2,898,699
ARTIFICIAL FISHING LURE
Ernest M. Kuehl, Birmingham, Mich.
Application October 10, 1957, Serial No. 689,344
4 Claims. (Cl. 43—42.09)

This invention relates to an artificial fishing lure and more particularly to such a lure having a front mounted wobble plate to which a fish hook is directly secured.

The invention comprises, in general, an artificial fishing lure of spinning or casting size, usually called a "plug," having a generally cylindrical body tapering and rounded off at its rearward end. In the instant construction the plug is preferably provided with a relatively flat slanted forward end in order to complement the design of the wobble plate; but the plug may have a front end design of any shape, as one prefers. The wobble plate is provided with a forward, slanted, dished or flat face integrally conjoined to a cradle portion complementing the shape and configuration of the plug body at its forward end. A single screw secures the cradle of the wobble plate to the plug body.

The cradle portion terminates with a downwardly directed appendage to which is secured a hook ring or loop, or the latter can be integrally formed with the cradle portion. The hook ring has a portion depending below the plug body and a portion looped upward and forward, seating in a longitudinal recess or slot in the underbelly of the plug body, there to secure the tip end of the loop in a slot or recess.

Minor modifications of the construction are shown in the drawing and described below.

It is an object of the invention to provide an attachable wobble plate to a plug, the plate being secured by a single screw. Another object is to provide a fish hook loop in association with the wobble plate. A further object is to provide means in the fish hook loop to secure the same in the plug body, so that only one screw will mount the wobble plate and fish hook loop to the plug body. Yet another object is to provide a simple, improved and inexpensive means for securing a fish hook to a wobble plate that will tend to reduce the cost of producing plug-type lures.

These and additional objects of the invention and features of construction are disclosed in the description given below, in which the terms are used for purposes of description and not of limitation.

Referring now to the drawing annexed hereto and forming an integral part of this specification, Fig. 1 is a side elevation of a plug body fitted with a wobble plate, according to the inventive construction.

Figure 1:
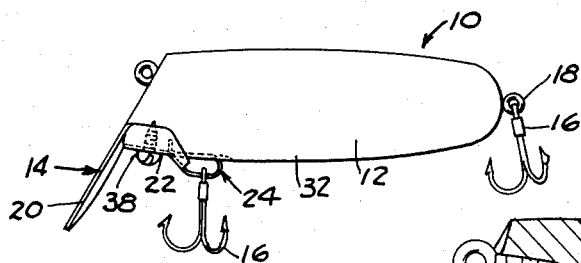

As shown in the several views of the drawing, and particularly in Figs. 1–4, the artificial fishing plug 10 is provided with a plug body 12, a wobble plate 14, and fish hooks 16.

The plug body 12 is generally cylindrical and elongated in shape, tapering and rounded off at its rearward end, where a fish hook 16 is secured to the body by a screw eye 18, according to methods long known and practiced in the art. The plug body 12 may be made of plastic, various chemical compositions or natural materials, as one prefers.

At the forward end of the plug body 12, the plug is provided with the wobble plate 14 which comprises a slanted face portion 20, a cradle portion 22 and an integrally formed fish hook loop 24, the lower element 26 of which depends below the plug body 12, the upper element 28 curving upward and reversing toward the front where it terminates in the bent lug 30.

To accommodate the upper element 28, the underbelly 32 of the plug body is provided with a longitudinal slot or notch 34 in which the element 28 seats itself, and with a lug slot or recess 36 for seating and securing the lug 30 in place.

The wobble plate front face 20 may be flat, or dished as shown, or otherwise arranged. It should, however, be slanted in order to achieve the desired wobbling action. The wobble plate 14 is preferably made of metal such as stainless steel, brass, spring steel or similar corrosion-resistant material. The cradle portion 22 fits complementarily about the underbelly 32 at the forward end of the plug body, seating itself forward of the loop slot 34. The single screw 38 secures the wobble plate 14 to the plug body 12.

In operation, the eye of a fish hook 16 is passed over lug 30 and upper element 28 so as to come to rest on the lower element 26. The lug 30 is placed in its slot 36, the upper element 28 resting in its slot 34, and the cradle 22 is placed upon the underbelly 32. The shank of screw 38 is passed through an opening central in the cradle 22 and threaded into the plug body 12, securing the wobble plate to the body. Lug 30, disposed in slot 36 immediately above the cradle 22, is securely locked in place when cradle 22 is attached to plug body 12 by fastener 38.

The fish hook 16 mounted on the loop element 26 is free to move from the cradle 22 to the upper element 28 adjacent the plug body. It is securely held by the loop 24 against the "strike" of any fish.

Figures 4, 5:
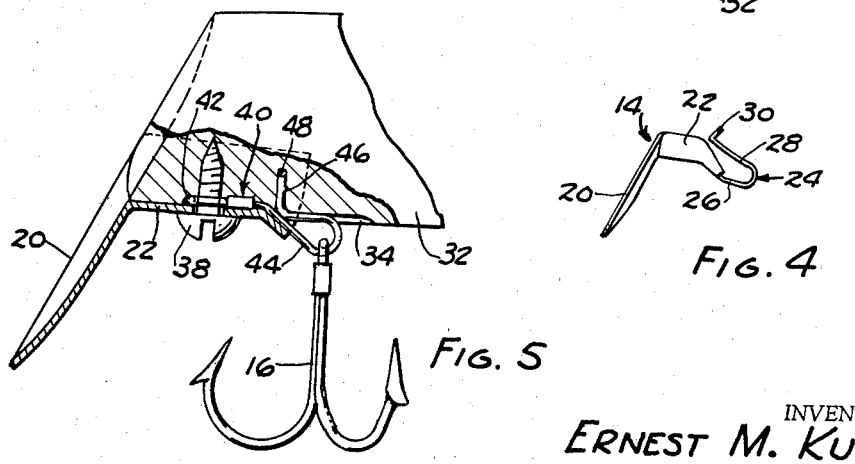
Fig. 4 is a side elevational view of the wobble plate of Fig. 1.
Fig. 5 is an enlarged fragmentary side elevational view, partially in section, of a modification of the wobble plate construction shown in Fig. 1.

A first modification takes the form shown in Fig. 5, in which the loop 40 is in the form of a wire having an eye 42 at one end, a fish hook securing loop web 44 and a terminal lug 46. The shank of screw 38 passes through an opening in cradle 22, through the loop eye 42, and threads into the plug body 12, after lug 46 has been seated in the slot or recess 48 to reecive it. The fish hook 16 is secured on loop 44 when lug 46 is passed into its seating recess 48, preventing release of the hook while permitting movement thereof between the cradle 22 and the plug body 12.

Figures 2, 6:
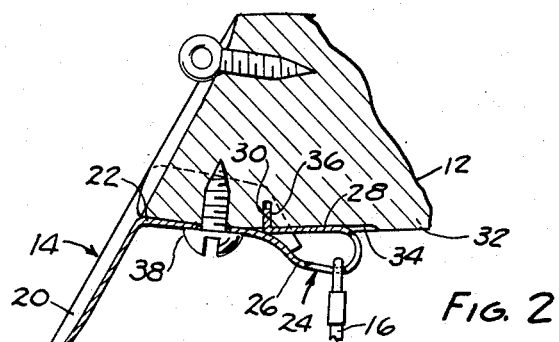
Fig. 2 is an enlarged, fragmentary vertical sectional view of the forward end of the construction shown in Fig. 1.
Fig. 6 is an enlarged side elevational view of a second modified form of the wobble plate.
Figure 3:
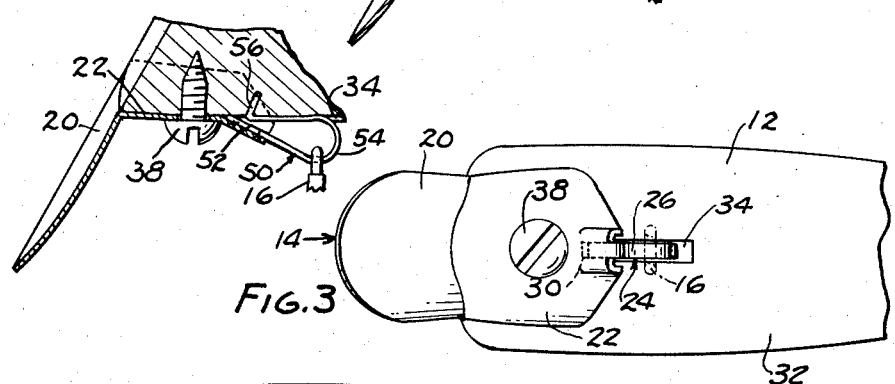
Fig. 3 is an enlarged fragmentary bottom plan view of the plug body shown in Fig. 1.

A second modification is shown in the arrangement of Fig. 6. In this form, the loop 50 has one end 52 secured to the cradle portion 22 by welding or brazing, an integral loop web portion 54 terminating at its other end in lug 56. Or, the loop end 52 may be mechanically conjoined by clamping or wrapping a portion of the cradle end about the loop end 52. The screw 38 secures this form of the wobble plate to the plug body in the same manner as above described, i.e. by passing the screw shank through the body of the cradle portion and threading it into the plug body 12.

In all forms of the invention, the loop lug 30, 46 or 56 is disposed in its seating slot or recess which is located immediately above a portion of the cradle 22.

Thus, when the cradle is brought into intimate contact with the underbelly 32 of the plug body 12, it forces the lug into a locked position thereabove.

The plug construction of this invention provides a means of substantially reducing the production cost of the artificial bait in making it easier and simpler to attach a front wobble plate 14 and hook combination by means of a single fastener. Replacement and exchange of fish hooks mounted on the wobble plate loop is also simplified by the instant construction.

Having described the invention in its simplest form, it is to be understood that the details of construction may be changed and varied in greater or lesser degree without departing from the essence of the invention.

I claim:

1. In an artificial fishing lure of the plug type, an elongated body, a wobble plate detachably secured to said body adjacent its forward end comprising a downwardly and forwardly inclined face portion integrally formed with a cradle portion for said body forward end, a fish hook supporting loop conjoined to said cradle portion and having a first element thereof spaced from said plug body and a second element reversely bent to said first element to form a loop, said second element terminating in a lug adapted to seat in a recess in said body adjacent said cradle portion, and fastening means to secure said wobble plate to said body at said cradle portion, said lug and recess being disposed immediately above a portion of said cradle, so that said cradle securely locks said lug in said recess when said cradle is fastened to said plug body.

2. In an artificial fishing lure of the plug type, an elongated body, a wobble plate detachably secured to said body adjacent its forward end comprising a downwardly and forwardly inclined face portion integrally formed with a cradle portion for said body forward end, a fish hook supporting loop integrally formed with and at the rearward end of said cradle portion and having a first element thereof spaced from said plug body and a second element reversely bent to said first element to form said loop, said second element being disposed in a shallow groove longitudinally arranged in said body, said second element terminating in a lug disposed substantially normal to the plane of said second element and adapted to seat in a complementary recess in said body adjacent the forward end of said groove above said cradle portion, and fastening means to secure said wobble plate to said body at said cradle portion, whereby said fish hook is secured by said loop to said body.

3. In an artificial fishing lure of the plug type, an elongated body, a wobble plate detachably secured to said body adjacent its forward end comprising a downwardly and forwardly inclined face portion integrally formed with a cradle portion for said body forward end, a fish hook supporting loop having two ends spaced apart and comprising a reversely looped web forming a support for said fish hook, said loop having one of its ends overlying said cradle portion, the other of said ends terminating in a lug adapted to seat in a complementary recess in said body, said hook output loop being disposed in depending relationship from said cradle portion and said body, said recess seated lug being disposed immediately above said cradle portion whereby said lug is restricted against release from said recess, and fastening means passing through said cradle portion and said loop end overlying said cradle portion securing the same to said body, said hook support loop being arranged at the rearward end of said cradle portion.

4. In an artificial fishing lure of the plug type, an elongated body, a wobble plate detachably secured to said body adjacent its forward end comprising a downwardly and forwardly inclined face portion integrally formed with a cradle portion for said body forward end, said cradle portion terminating at its rearward end in a tail portion, a fish hook supporting loop in depending relationship to said body comprising a reversely looped web forming a support for said fish hook, said loop having two ends spaced apart having one of sadi ends secured and conjoined to said tail portion and terminating at the other of said ends in a lug adapted to seat in a complementary recess in said body at an angle substantially normal to said looped web, said recess seated lug being disposed immediately above said cradle portion whereby said lug is restricted against release from said recess, and fastening means to secure said wobble plate to said body at said cradle portion.

References Cited in the file of this patent

UNITED STATES PATENTS

| | | |
|---|---|---|
| 1,113,360 | Lockhart | Oct. 13, 1914 |
| 2,218,421 | Edgar | Oct. 15, 1940 |
| 2,249,770 | McArthur | July 22, 1941 |
| 2,456,705 | Herring | Dec. 21, 1948 |
| 2,556,205 | McRoberts | June 12, 1951 |
| 2,674,060 | Simmons | Apr. 6, 1954 |